April 11, 1967 J. H. HACKENBERG ET AL 3,313,884

RECEIVER SYNCHRONIZED AND CONTROLLED FACSIMILE SYSTEM

Filed Oct. 10, 1963 2 Sheets-Sheet 1

INVENTORS
JOHN H. HACKENBERG
GARVICE H. RIDINGS
BY J. B. Burke
ATTORNEY

April 11, 1967 J. H. HACKENBERG ET AL 3,313,884

RECEIVER SYNCHRONIZED AND CONTROLLED FACSIMILE SYSTEM

Filed Oct. 10, 1963 2 Sheets-Sheet 2

INVENTORS
JOHN H. HACKENBERG
GARVICE H. RIDINGS
BY J. B. Burke
ATTORNEY

United States Patent Office 3,313,884
Patented Apr. 11, 1967

3,313,884
RECEIVER SYNCHRONIZED AND CONTROLLED FACSIMILE SYSTEM

John H. Hackenberg, Forest Hills, N.Y., and Garvice H. Ridings, Summit, N.J., assignors to The Western Union Telegraph Company, New York, N.Y., a corporation of New York
Filed Oct. 10, 1963, Ser. No. 315,229
13 Claims. (Cl. 178—69.5)

Figure 1:
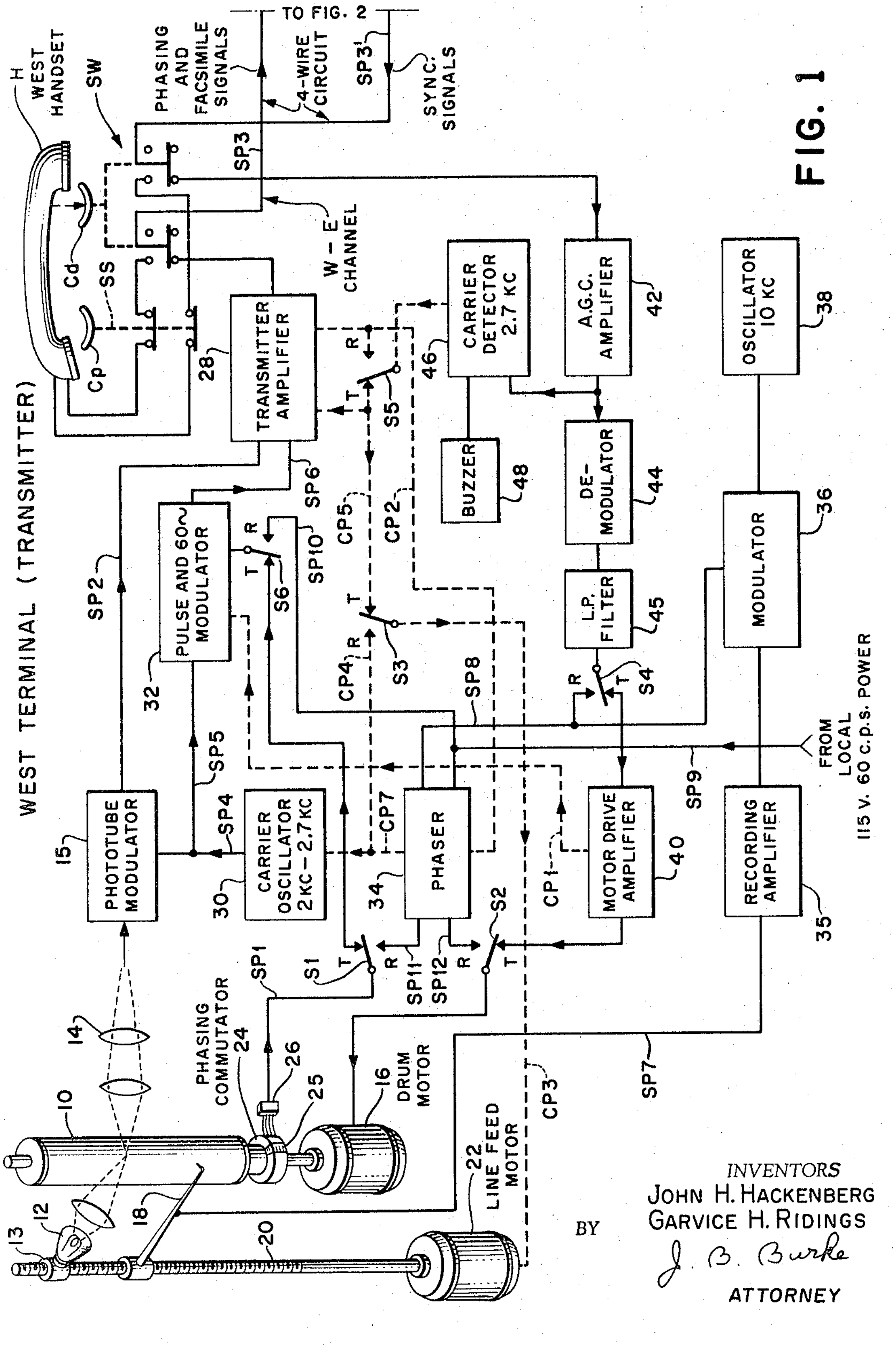

This invention concerns a facsimile transmission system in which a receiver effects synchronization with a remotely located transmitter over a four-wire circuit.

When a facsimile transmitter and a facsimile receiver which provide facsimile message service over a circuit use the same commercial power supply, synchronization is relatively simple. However, when the power supply at the transmitter is different from the one at the receiver, synchronization becomes a difficult problem. In such case, in the prior art rather costly and bulky apparatus is required to effect synchronization between transmitter and receiver. In prior systems, synchronization was generally effected by use of precision standard frequency generator at the transmitter and receiver respectively. The output of one frequency generator was amplified to drive the scanning motor at the transmitter. A like arrangement was used to amplify the output of the frequency generator at the receiver to drive the facsimile recorder motor. The tolerance standards of these precision frequency generators are very high and an error or frequency difference between generators of one part in one hundred thousand is commonly specified. Any greater error results in perceptible distortion of transmitted graphic copy.

In a system where there is only one transmitter and many receivers, an error in synchronization is readily located. If all receivers have the same transmission error or defect, then it is apparent that the fault is in the transmitter frequency standard. If any receiver has a different error from all the others, then the synchronization defect is in that one receiver. Thus servicing efforts can be applied directly to the receiver which is apparently out of synchronization. In a commercial facsimile system where one patron transmits a facsimile message to a second patron who in turn transmits a message to a third patron and so on, then other servicing difficulties arise. It is then not readily ascertainable, if a synchronization error or fault develops, as to where the defect exists, i.e., in the transmitter or receiver. This has necessited maintaining a primary frequency standard at a central office, with which all transmitters and receivers are periodically checked for correct synchronization. The expense and complexity of such a central office and the necessity of connection thereto and synchronization therewith is avoided in the present invention.

In the present invention, precision frequency standards are not required and it is not necessary to provide a central office to maintain such standards. According to the present invention, each patron transmitting a facsimile message employs an amplified signal derived from the commercial power supply at the receiver, thus avoiding the use of a precision frequency standard at both receiver and transmitter, and avoiding the use of a central office to generate a primary standard frequency.

In the present system, a four wire circuit is used with facsimile transmission in only one direction at a time. This leaves the return path free for the transmission of a synchronizing signal from the receiving terminal to the transmitting terminal. Each patron has transmitter-receiver equipment so that either patron can transmit while the other patron receives. When one patron is ready to transmit and the other is ready to receive, the receiving patron starts his facsimile recording drum using his own commercial 60-cycle power. His receiving circuits are energized and simultaneously his transmitting carrier is modulated in a modulator by the commercial 60-cycle power. This modulated signal is applied to the return wires or channel to the message transmitting patron. At the transmitting patron's station, this 60-cycle signal is recovered in a demodulator and is applied to a motor drive amplifier which causes the transmititng drum of the transmitting patron to start up and run in synchronism with the recording drum of the receiving patron. Thereafter, phasing pulses are transmitted and transmission proceeds to conclusion.

By eliminating the need for a costly frequency standard at each patron's transceiver, a substantial reduction in overall cost of the transceiver station is effected. Another advantage derived is the provision for automatic answer-back at the start of transmission which prevents transmission to an unpowered receiver. Open-circuit indication at the transmitting station or terminal is inherently provided. If for any reason the received copy is not coming in satisfactorily or the receiver is malfunctioning, the receiving patron can break the transmission by simply turning off his receiver drum, thereby automatically stopping the transmitting drum at the transmitter terminal.

It is therefore the principal object of the present invention to provide a facsimile transmission system in which a transceiver at a receiving terminal controls transmission from a transmititng terminal.

Other objects are to provide in a facsimile transmission system having two facsimile transceivers at two terminals connected by a four-wire circuit:

(a) Automatic answer-back at start-of-transmission to an unpowered transceiver.

(b) Open-circuit indication at the transmitting terminal.

(c) an arrangement whereby turning off of the recording drum at the receiving terminal automatically breaks transmission between both terminals.

(d) An arrangement whereby turning off of the recording drum at the receiving terminal or breaking off of transmission between terminals automatically stops the transmitting drum at the transmitting terminal.

Figure 2:
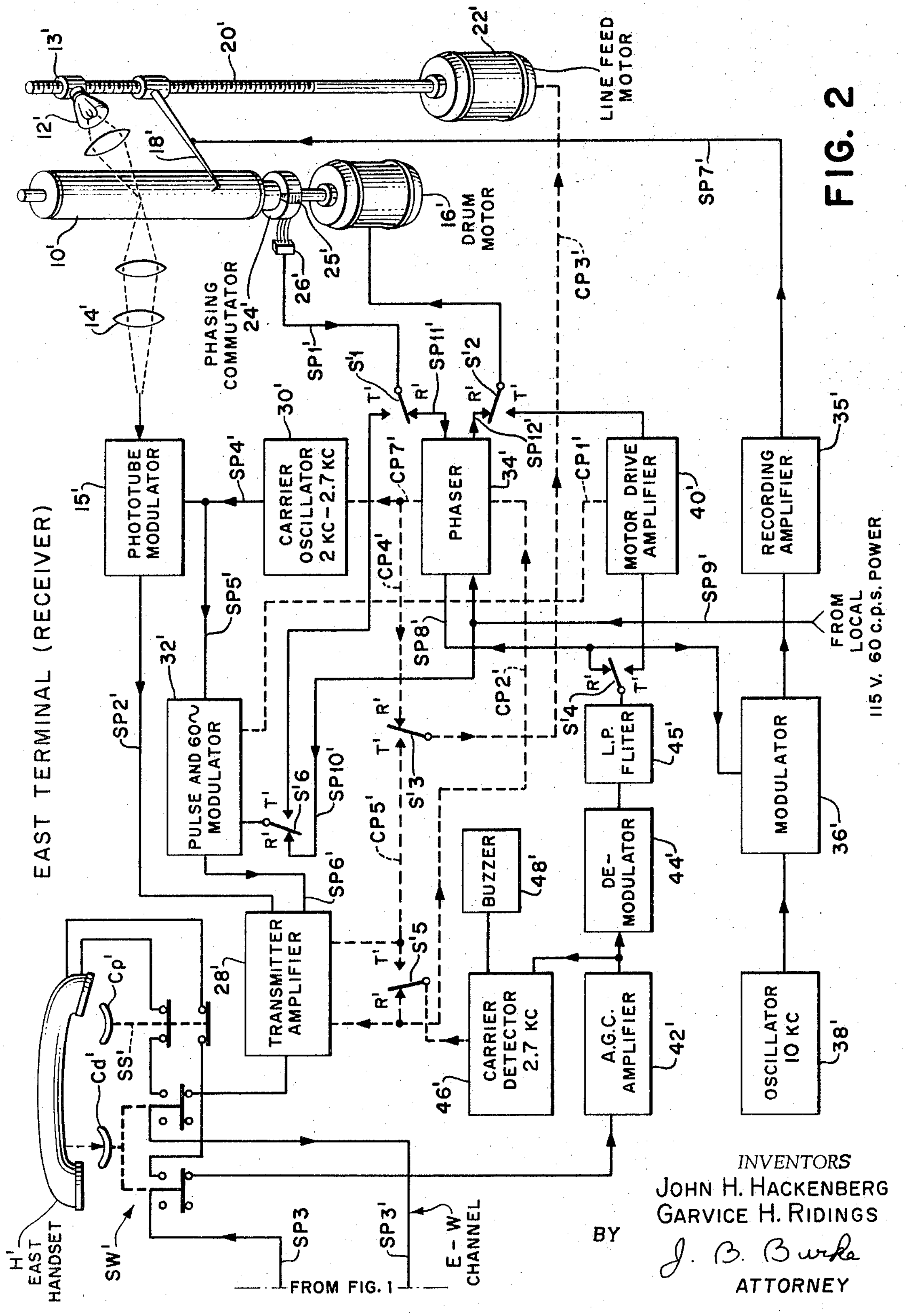

Other and further objects and advantages of the invention will become apparent from the following detailed description taken with the drawing, wherein:

FIG. 1 and FIG. 2 together constitute a block diagram of a system embodying the invention.

In the drawing, signal paths between blocks are shown as solid lines and control paths are shown as dotted lines. East and West terminals are shown and each is a mirror image of the other. Each terminal constitutes a transceiver station. For purposes of explanation, the West terminal is considered as the signal transmitting terminal and the East terminal is the signal receiving terminal. Thus rotating drum 10 at the transmitting terminal is being scanned by a light system including lamp 12, lenses 14 and a phototube modulator 15. The lamp and lenses are carried by a scanning head 13 on lead screw 20.

Drum 10 is driven by a motor 16. The scanning head 13 and stylus 18 are driven along the drum by a lead screw 20 rotated by line feed motor 22. The drum 10 has a phasing commutator 24 on which rides brush 26. The commutator has a conductive phasing element 25. In circuit with brush 26 is a signal path SP1 connected to switch S1. The drum motor 16 is connected to switch S2.

Phototube modulator 15 may be one of a known type such as described in U.S. Patent No. 3,048,702. Signal path SP2 is connected from the modulator 15 to a transmitter amplifier 28. This amplifier is of a conventional type and may include a vestigial sideband filter. The amplifier is connected via a two wire path in West-East channel SP3.

A carrier oscillator 30 is connected via signal path SP4 to the modulator 15 and via branch path SP5 to pulse and sixty-cycle modulator 32. The pulse modulator applies a modulated carrier via signal path SP6 to the amplifier 28. Terminal T of switch S1 is connected to terminal T of switch S6. This switch is connected to the modulator 32. Oscillator 30 is connected via control signal path CP7 to a phaser of phasing circuit 34. This phasing circuit may be of a known type such as described in U.S. Patent No. 2,742,526.

Stylus 18 is connected to recording amplifier 35 via signal path SP7 which receives modulated signals from a modulator 36. An oscillator 38 applies a 10 kilocycle carrier to the modulator 36. The phaser 34 is connected via signal path SP8 to the modulator 36 and to terminal R of switch S4. The local 60 cycles per second power supply is connected via path SP9 to the phaser 34 and to terminal R of switch S6 by signal path SP10.

The output of a motor drive amplifier 40 is connected to terminal T of switch S2 and the input to terminal T of switch S4. The East-West channel SP3' is a two wire line connected to an automatic gain control amplifier 42. Amplifier 42 is connected to demodulator 44 which is connected to terminal T of switch S4 via a low-pass filter 45. The amplifier 42 is also connected to carrier detector 46. This detector has a buzzer 48 which emits an audible signal when a signal is being detected by the detector.

Singal paths SP11, SP12 are connected from the phaser 34 to terminals R of switches S1 and S2 respectively.

Control signal path CP1 is connected from motor drive amplifier 40 to pulse and sixty cycle modulator 32. Phaser 34 is connected via control signal path CP2 to terminal R of switch S5 and to amplifier 28. Line feed motor 22 is connected via control signal path CP3 to switch S3. Terminal R of switch S3 is connected to control path CP7 via control signal path CP4. Terminal T of switch S3 is connected to terminal T of switch S5 and to amplifier 28 via control signal path CP5.

Switches S1–S6 may be individual switches but preferably they are all ganged together so that a single button or relay may operate all switches simultaneously to change the movable contacts from terminals R to terminal T or vice versa.

A telephone handset H is provided at the West terminal. The handset has a phone cradle $C_p$ which includes a switch SS that cuts-off the handset from the circuit when the handset is on the cradle and that connects the handset to the circuit when the handset is off this cradle. The handset has a data cradle $C_d$ provided with a switch SW. The switch SW is closed in one position when the handset is lifted from cradle $C_d$ so that the handset is connected directly to channel SP3 through the switch of phone cradle $C_p$, while the amplifier 28 is disconnected from line SP3. When the handset is placed on the data cradle $C_d$, switch SW is closed in another position, the line SP3 is reconnected to amplifier 28 and the handset H is disconnected from the line at switch SW.

Since the East terminal of FIG. 2 is a mirror image of the West terminal of FIG. 1 the above description of the West terminal will suffice for the East terminal, it being understood that all components and signal paths of the East terminal designated by primed numbers are identical to those of the West terminal.

To facilitate the following description of the mode of operation of the system, the West terminal or transceiver will be referred to as the *transmitter* and the East terminal or transceiver will be referred to as the *receiver*. Switches S1–S6 are all placed in the T position for transmitting signals to the receiver and switches S1'–S6' are all placed in the R' position for receiving signals from the transmitter. In order to effect this positioning of the switches, a patron who is originating transmission at the transmitter will first place the material to be transmitted on his drum 10 and set switches S1–S6 in the T position. The patron will then dial the desired receiving patron through a telephone dialing system (not shown) after lifting his handset from phone cradle $C_p$. The called receiving patron will lift his handset H' from his phone cradle $C_{p'}$. Upon receiving oral confirmation of the receiving patron's identity, the transmitting patron will announce his own identity and his intention to start transmitting a facsimile message. The receiving patron will load his drum 10' with a facsimile recording blank if this has not already been done and will set the switches S1'–S6' to the R' position for receiving the facsimile message. Both patrons will place their handsets on their respective data cradles $C_d$, $C_{d'}$. The telephone circuit as explained previously between the transmitter and receiver uses the two two-wire lines SP3, SP3' to which the telephone handsets H and H' at the transmitter and receiver respectively will be connected. When both patrons place their handsets H, H' on the data cradles $C_d$, $C_{d'}$, the handsets will be disconnected from lines SP3, SP3' leaving the facsimile transmission circuits connected as shown in FIGS. 1, 2.

When the transmitting patron closes switches S1–S6 the West terminal transceiver is arranged as a transmitter and drum motor 16 is connected to the output of motor-drive amplifier 40 via switch S2. The drum does not rotate however until appropriate synchronizing signals are received from the distant receiver. When the receiving patron sets switches S1'–S6' to the R' position, the East terminal transceiver is arranged as a receiver and local commercial 60 cycles per second power is applied to the drum motor 16'. This motor which is a synchronous motor immediately starts and rotates at a speed determined by the frequency of the commercial power source. At the same time the local commercial 60 cycles per second power is caused to modulate the carrier frequency of the distant transceiver and this signal is transmitted to the transmitter over the East-West channel SP3'. At the transmitter this signal passes through the A.G.C. amplifier 42. It is demodulated in demodulator 44, filtered in filter 45, and fed to the input of the motor-drive amplifier 40 via switch S4, causing the drum motor 16 to rotate at a speed determined by the frequency of the commercial power at the distant receiver.

Phasing pulses are transmitted to the distant receiver, phasing takes place, and transmission of the facsimile copy proceeds. Exact synchronism is achieved since both drums 10, 10' run at a speed determined by the frequency of the commercial power at the distant receiver.

At the conclusion of the transmission buzzers 48, 48' sound at each transceiver, both patrons remove the handsets from their cradles $C_d$, $C_{d'}$ thereby reconnecting the handsets H, H' to the line circuits SP3, SP3' and disconnecting the facsimile transceivers. Receipt of the facsimile copy is acknowledged orally by the distant receiving patron and both patrons then return the handsets to their phone cradles $C_p$, $C_{p'}$ thereby terminating the telephone circuit connection between the two patrons.

Setting of switches S1–S6 at the transmit position T, energizes the West transceiver as a transmitter, removes a disabling circuit from transmitting amplifier 28 and causes a 2700-cycle carrier generated by carrier oscillator 30 to pass unmodulated through modulator 32 and transmitting amplifier 28 to the West-East channel SP3. Setting of switches S1'–S6' at the receiving position R' energizes the transceiver at the East terminal as a receiver, connects the drum motor 16' to local alternating current power through phase 34' (which is now inoperative), and causes a 2000-cycle carrier to be generated by carrier oscillator 30'. The 2700-cycle carrier from the West-East channel SP3 passes through automatic gain control amplifier 42' and its presence is detected by carrier detector 46'. Operation of carrier detector 46' causes a disabling circuit to be removed from transmitting amplifier 28' and causes the phasing unit or phaser 34' to become operative. The phasing unit now periodically interrupts the power to the receiver drum motor 16' causing the motor to drift, that is, to run at a speed somewhat less than synchronous speed.

The 2000-cycle carrier generated by carrier oscillator 30' is modulated by the local commercial 60 c.p.s. power supplied to the East terminal. The 60 c.p.s. signal is clipped and shaped in modulator 32' so that the signal envelope from this unit has rise and decay times comparable to these of the facsimile signals from phototube modulator 15' which at this time are prevented from passing through transmitting amplifier 28'. The synchronizing signals however pass through transmitting amplifier 28' of the receiver over the East-West channel SP3' and through A.G.C. amplifier 42 of the transmitter. The 60 c.p.s. modulation is recovered in demodulator and filter 44, 45 and is fed into motor drive amplifier 40 to operate the drum motor 16 of the transmitter. The output of A.G.C. amplifier 42 also appears at the input of carrier detector 46 but it is insensitive to the 2000-cycle carrier.

After a short time delay to insure that the transmitter drum motor 16 has achieved synchronous speed the output of motor drive amplifier 40 causes the 2700-cycle carrier being generated by oscillator 30 to be modulated by phasing pulses generated by the rotation of the transmitter drum. This modulation takes place in modulator 32, the output of which appears as a 2700-cycle carrier interrupted once each drum revolution. This phasing signal passes through transmitting amplifier 28 of the transmitter, over the West-East channel SP3, through A.G.C. amplifier 42' of the receiver. The output of this amplifier is fed to demodulator 44', filter 45', and to carrier detector 46'. The periodic drop in amplitude of the 2700-cycle carrier due to the presence of the phasing pulse in no way affects the operation of the carrier detector and it remains operated as it was by the unmodulated carrier. The phasing pulse from the transmitter recovered in demodulator filter 44', 45' and a similar phasing pulse generated by the rotation of the receiver drum 10' are now compared in the phaser or phasing unit 34'. When coincidence occurs the phasing unit instantly closes the circuit of motor 16' and keeps it closed so that the receiver drum 10' runs synchronously and in phase with the transmitter drum 10.

At this same time phasing unit 34' causes the receiver line feed motor 22' to be energized and carrier oscillator 30' to change its frequency from 2000 to 2700 cycles. Suitable arrangements are provided to insure that no level change or other disturbance due to this change of carrier frequency affects the 60-cycle modulation on this channel so that the two transceivers continue to run in synchronism and in phase. At the transmitter carrier detector 46 responds to the presence of the 2700-cycle carrier by switching inputs of transmitting amplifier 28, that is, by rejecting the output of modulator 32 and accepting the output of phototube modulator 15 which is amplified and applied to the West-East channel SP3. At the same time carrier detector 46 causes the transmitter line feed motor 22 to be energized thereby advancing lamp 12 and starting transmission of the facsimile copy signals.

In order to secure optimum reproduction of the facsimile copy normally transmitted over the system and to achieve dependable, fast, continuously acting automatic gain control "white transmission" is employed; that is, maximum signals over the transmission channel corresponds to the white (or minimum density) areas of the graphic copy. These signals received over the West-East channel SP3 pass through A.G.C. amplifier 42' and demodulator filter 44', 45', where the baseband signals are recovered. These baseband signals now modulate in modulator 36' a higher frequency carrier generated in oscillator 38' and at the same time picture inversion is accomplished; that is, at the output of modulator 36' maximum level corresponds to black (or maximum density) areas of the graphic copy. These amplitude-modulated carrier signals are amplified in recording amplifier 35' and applied to the recording stylus 18'. The use of a higher frequency for recording than that used for transmission results in improved definition and readability of the record.

Transmission of the subject copy continues until movement of the transmitter scanning head 13 energizes an end-of-message which causes a buzzer to sound at the transmitter. Upon operation of a "stop" button by the patron at the transmitter (or automatically if the scanning head 13 is allowed to feed the full length of its travel) transmission of the 2700-cycle carrier to the receiver ceases. At the receiver this absence of carrier detected by carrier detector 46' causes buzzer 48' to sound, signaling the receiving patron that the transmission is completed.

It will be noted that a number of very desirable features and/or safeguards are incorporated in the control circuitry of the system, for example:

(1) No frequency standard is required in this system. Both transceivers run at a speed determined by the frequency of the alternating commercial power at the receiver. In addition to a substantial monetary saving the necessity of periodic trimming of the frequencies of the standards is avoided. This could be particularly bothersome in a switched system involving a large number of stations.

(2) Transmission cannot be started to an unpowered receiver and the patron at the transmitter is made aware of this by failure of the transmitter drum to start rotating after a few seconds. Power failure at the receiver during a transmission will also be apparent to the patron at the transmitter since the transmitter drum will stop rotating.

(3) Wide-range automatic gain control is provided for the phasing pulse, the facsimile signals, and the synchronization signals.

(4) The transmission channels are "tested" and must be continuous in both directions before the two drums can phase.

(5) Phasing must be accomplished before scanning can start with either drum.

(6) Both terminals will receive an indication of a circuit interruption after a transmission has started thereby providing important protection against losing part of a transmission without knowing it and enabling either patron to promptly take corrective measures.

(7) If the patron originating a transmission inadvertently sets switches S1–S6 at the receive position R he is made aware of the error by the fact that his drum starts to rotate immediately and there is no line feed by motor 22. If the patron at the receiver terminal inadvertently sets switches S1'–S6' at the transmit position T' his buzzer will sound to call his attention to the error and there will be no line feed by motor 22'.

What is claimed and sought to be protected by Letters Patent is:

1. In a facsimile transmission system, in combination:
a transmitting terminal;
a receiving terminal;
a transmission path connecting the terminals;
means at the transmitting terminal for optically scanning at a controllable speed successive lines of graphic material to derive light pulses therefrom;
means at the transmitting terminal for converting the light pulses to electrical message signals and for feeding the electrical signals to said path for transmission to the receiving terminal;
recording means at the receiving terminal for converting at controllable speed the electrical message signals received from said path into graphic copy duplicating said graphic material;
an alternating current power supply at said receiving terminal for driving said recording means at a speed determined by the frequency of said power supply;

means for transmitting from the receiving terminal to the transmitting terminal through said path control signals having a frequency corresponding to that of said power supply; and means at the transmitting terminal for receiving said control signals and for controlling the speed of the scanning means so that the speed of the scanning means is synchronous with the speed of the recording means.

2. In a facsimile transmission system, in combination:
a transmitting terminal;
a receiving terminal;
two signal transmission channels connecting the terminals;
means at the transmitting terminal for optically scanning at a controllable speed successive lines of graphic material to derive light pulses therefrom;
means at the transmititng terminal for converting the light pulses to electrical message signals and for feeding the electrical signals to one of said channels for transmission to the receiving terminal;
recording means at the receiving terminal for converting at controllable speed the electrical message signals received from said one channel into graphic copy duplicating said graphic material;
an alternating current power supply at said receiving terminal for driving said recording means at a speed determined by the frequency of said power supply;
means for transmitting from the receiving terminal to the transmitting terminal over the other of said two channels control signals having a frequency corresponding to that of said power supply; and
means at the transmitting terminal for receiving said control signals and for controlling the speed of the scanning means so that the speed of the scanning means is synchronous with the speed of the recording means.

3. In a facsimile transmission system, in combination:
two transceiver terminals;
a transmission path connecting the terminals;
switch means at both terminals so that either terminal is selectively operated for message signal transmission while the remaining terminal is selectively operated for message signal reception;
optical scanning means at both transceiver terminals for optically scanning at controllable speed successive lines of graphic material to derive light pulses therefrom;
means at both terminals for converting the light pulses to electrical message signals at either terminal and for feeding the electrical message signals to said path for transmission to the remaining terminals;
recording means at both terminals for converting received electrical message signals into graphic copy at controllable speed, said switch means being in circuit with the scanning and recording means at both transceiver terminals so that the scanning means at one transceiver terminal is activated while the recording means at said one transceiver terminal is deactivated, and so that the recording means at the other transceiver terminal is activated while the scanning means at the other transceiver terminal is deactivated;
alternating current power supplies at both transceiver terminals for respectively driving the scanning means at said one transceiver terminal and the recording means at the other transceiver terminal;
means at said other transceiver terminal for applying alternating current derived from one of said power supplies to the recording means at said other transceiver terminal to drive the recording means at a certain speed;
means at said other transceiver terminal for transmitting through said path to said one transceiver terminal control signals having a frequency corresponding to that of said one power supply; and
means at said one transceiver terminal for receiving said control signals and for controlling the speed of the scanning means thereat in synchronism with the speed of the recording means at said other transceiver terminal.

4. In a facsimile system, the combination according to claim 3, further comprising means at both terminals in circuit with said switching means for selectively stopping the scanning means at said one transceiver terminal in the event said one transceiver terminal fails to receive proper control signals from said other transceiver terminal.

5. In a facsimile system, the combination according to claim 4, further comprising means at both terminals in circuit with said switching means for selectively cutting off transmission of said control signals at said other transceiver terminal in the event that reception of said message signals at said other transceiver terminal is unsatisfactory, whereby the scanning means at said one transceiver terminal is stopped.

6. In a facsimile transmission system, in combination:
two transceiver terminals;
two transmission channels connecting the terminals;
switch means at both terminals so that either terminal is selectively operated for message signal transmission while the remaining terminal is selectively operated for message signal reception;
optical scanning means at both transceiver terminals for optically scanning at controllable speed successive lines of graphic material to derive light pulses therefrom;
means at both terminals for converting the light pulses to electrical message signals at either terminal and for feeding the electrical message signals to one of said channels for transmission to the remaining terminal;
recording means at both terminals for converting received electrical message signals into graphic copy at controllable speed, said switch means being in circuit with the scanning and recording means at both transceiver terminals so that the scanning means at one transceiver terminal is activated while the recording means at said one transceiver terminal is deactivated, and so that the recording means at the other transceiver terminal is activated while the scanning means at the other transceiver terminal is deactivated;
alternating current power supplies at both transceiver terminals for respectively driving the scanning means at said one transceiver terminal and the recording means at the other transceiver terminal;
means at said other transceiver terminal for applying alternating current derived from one of said power supplies to the recording means at said other transceiver terminal to drive the recording means at a certain speed;
means at the other transceiver terminal for transmitting through the other of said two channels to said one transceiver terminal control signals having a frequency corresponding to that of said one power supply; and
means at said one transceiver terminal for receiving said control signals and for controlling the speed of the scanning means thereat in synchronism with the speed of the recording means at said other transceiver terminal.

7. In a facsimile transmission system, the combination according to claim 6, further comprising means at both terminals in circuit with said switching means for selectively stopping the scanning means at said one transceiver terminal in the event said one transceiver terminal fails to receive proper control signals from said other transceiver terminal.

8. In a facsimile transmission system, the combination according to claim 7, further comprising means at both terminals in circuit with said switching means for selectively cutting off transmission of said control signals at said other transceiver terminal in the event that reception of said message signals at said other transceiver terminal is unsatisfactory, whereby the scanning means at said one transceiver terminal is stopped.

9. In a facsimile transmission system, in combination:
a transmitting terminal;
a receiving terminal;
a transmission path connecting the terminals;
means at the transmitting terminal for optically scanning at a controllable speed successive lines of graphic material to derive light pulses therefrom;
means at the transmitting terminal for converting the light pulses to electrical message signals and for feeding the electrical signals to said path for transmission to the receiving terminal;
recording means at the receiving terminal for converting at controllable speed the electrical message signals received from said path into graphic copy duplicating said graphic material;
an alternating current power supply at said receiving terminal for driving said recording means at a speed determined by the frequency of said power supply;
means for transmitting from the receiving terminal to the transmitting terminal through said path control signals having a frequency corresponding to that of said power supply;
means at the transmitting terminal for receiving said control signals and for controlling the speed of the scanning means so that the speed of the scanning means is synchronous with the speed of the recording means; and
means at the transmitting terminal for stopping said scanning means in the event that the transmitting terminal fails to receive proper control signals from the receiving terminal.

10. In a facsimile transmission system, the combination according to claim 9 further, comprising:
means at the receiving terminal for cutting off transmission of said control signals in the event that reception of message signals at the receiving terminal is unsatisfactory, whereby the scanning means at the transmitting terminal is stopped.

11. In a facsimile transmission system, in combination:
a transmitting terminal;
a receiving terminal;
two signal transmission channels connecting the terminals;
means at the transmitting terminal for optically scanning at a controllable speed successive lines of graphic material to derive light pulses therefrom;
means at the transmitting terminal for converting the light pulses to electrical message signals and for feeding the electrical signals to one of said channels for transmission to the receiving terminal;
recording means at the receiving terminal for converting at controllable speed the electrical message signals received from said one channel into graphic copy duplicating said graphic material;
an alternating current power supply at said receiving terminal for driving said recording means at a speed determined by the frequency of said power supply;
means for transmitting from the receiving terminal to the transmitting terminal over the other of said two channels control signals having a frequency corresponding to that of said power supply;
means at the transmitting terminal for receiving said control signals and for controlling the speed of the scanning means so that the speed of the scanning means is synchronous with the speed of the recording means; and
means at the transmitting terminal for stopping said scanning means in the event that the transmitting terminal fails to receive proper control signals from the receiving terminal.

12. In a facsimile transmission system, the combination according to claim 11, further comprising:
means at the receiving terminal for cutting off transmission of said control signals in the event that reception of message signals at the receiving terminal is unsatisfactory, whereby the scanning means at the transmitting terminal is stopped.

13. In a facsimile system, in combination:
a facsimile signal transmitter;
a facsimile recorder;
two-way transmission channels connecting the transmitter and recorder;
graphic copy scanning means at the transmitter;
means at the transmitter for controlling the speed of copy scanning;
speed control means at the recorder;
a fixed frequency power supply for said speed control means at the recorder;
means at the recorder for sending a sample of the frequency used in controlling the speed of the recorder, to the transmitter for controlling the speed of scanning;
means at the transmitter for using said sample of frequency from the recorder for controlling the speed of scanning at the transmitter;
means at the transmitter for generating a phasing pulse during each scan and for transmitting said pulse to the recorder;
means at the recorder for detecting said phasing pulse;
means at the recorder for causing recording to be in phase with the phasing pulse from the transmitter; and
means at the transmitter to cause the transmitter to cease transmitting phasing pulses and to start scanning copy in response to phasing of the recorder.

References Cited by the Examiner

UNITED STATES PATENTS

| | | | |
|---|---|---|---|
| 2,689,273 | 9/1954 | Ridings | 178—69.5 |
| 2,753,396 | 7/1956 | Gore | 178—69.5 |
| 3,149,201 | 9/1964 | Huber | 178—6.8 |

DAVID G. REDINBAUGH, *Primary Examiner.*

J. McHUGH, R. L. RICHARDSON, *Assistant Examiners.*